United States Patent
Kurimoto et al.

(10) Patent No.: US 12,283,434 B2
(45) Date of Patent: Apr. 22, 2025

(54) SOLID ELECTROLYTIC CAPACITOR ELEMENT AND SOLID ELECTROLYTIC CAPACITOR

(71) Applicant: Panasonic Intellectual Property Management Co., Ltd., Osaka (JP)

(72) Inventors: Takuya Kurimoto, Kyoto Fu (JP); Hitoshi Fukui, Saga Ken (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 130 days.

(21) Appl. No.: 17/923,767

(22) PCT Filed: Apr. 30, 2021

(86) PCT No.: PCT/JP2021/017218
§ 371 (c)(1),
(2) Date: Nov. 7, 2022

(87) PCT Pub. No.: WO2021/230111
PCT Pub. Date: Nov. 18, 2021

(65) Prior Publication Data
US 2023/0178306 A1   Jun. 8, 2023

(30) Foreign Application Priority Data
May 15, 2020   (JP) .................. 2020-086103

(51) Int. Cl.
*H01G 9/025*   (2006.01)
*H01G 9/04*   (2006.01)
*H01G 9/042*   (2006.01)

(52) U.S. Cl.
CPC ........... *H01G 9/025* (2013.01); *H01G 9/0425* (2013.01)

(58) Field of Classification Search
CPC ....... H01G 9/025; H01G 9/0425; H01G 9/004
(Continued)

(56) References Cited

U.S. PATENT DOCUMENTS

| | | | |
|---|---|---|---|
| 6,430,033 B1 * | 8/2002 | Mitsui | H01G 11/56 29/25.03 |
| 2004/0125543 A1 * | 7/2004 | Hirano | H05K 1/186 361/523 |

(Continued)

FOREIGN PATENT DOCUMENTS

| | | |
|---|---|---|
| CN | 107615423 A | 1/2018 |
| JP | H11-72969 A | 3/1999 |

(Continued)

OTHER PUBLICATIONS

International Search Report issued in International Patent Application No. PCT/JP2021/017218 mailed Jul. 20, 2021; with English translation.

(Continued)

*Primary Examiner* — Arun Ramaswamy
(74) *Attorney, Agent, or Firm* — Rimon P.C.

(57) ABSTRACT

A solid electrolytic capacitor element includes an anode body, a dielectric layer formed at the surface of the anode body, and a cathode portion that covers at least a part of the dielectric layer. The cathode portion includes a solid electrolyte layer that covers at least a part of the dielectric layer. The solid electrolyte included in the solid electrolyte layer has a weight reduction ratio of 3% or less when measured through thermogravimetric analysis in which the solid electrolyte is heated to 180° C., is kept at 180° C. for 20 minutes, is cooled from 180° C. to 30° C., and is then heated from 30° C. to 260° C. at a rate of 20° C./min.

16 Claims, 1 Drawing Sheet

(58) Field of Classification Search
USPC .................................................. 361/523, 525
See application file for complete search history.

(56) References Cited

U.S. PATENT DOCUMENTS

| | | |
|---|---|---|
| 2005/0237696 A1 | 10/2005 | Takeda et al. |
| 2006/0076541 A1 | 4/2006 | Yoshida et al. |
| 2011/0122546 A1 | 5/2011 | Nobuta et al. |
| 2013/0229750 A1 | 9/2013 | Nobuta et al. |
| 2014/0092529 A1* | 4/2014 | Nobuta .................. H01G 11/56 427/80 |
| 2018/0068802 A1 | 3/2018 | Uka et al. |

FOREIGN PATENT DOCUMENTS

| | | |
|---|---|---|
| JP | 2003-289015 A | 10/2003 |
| JP | 2004-265941 A | 9/2004 |
| JP | 2006-131873 A | 5/2006 |
| JP | 2011-111521 A | 6/2011 |
| JP | 2014-175424 A | 9/2014 |
| JP | 2014-225538 A | 12/2014 |

OTHER PUBLICATIONS

Chinese Office Action dated Jan. 23, 2025 issued in the corresponding Chinese Patent Application No. 202180032435.2, with partial English translation.

* cited by examiner

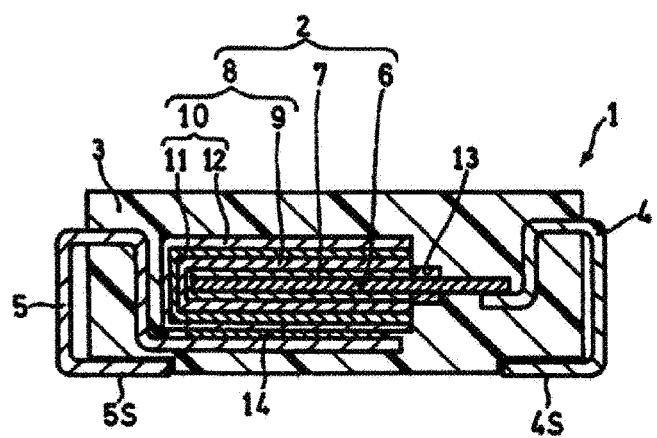

SOLID ELECTROLYTIC CAPACITOR ELEMENT AND SOLID ELECTROLYTIC CAPACITOR

CROSS-REFERENCE TO RELATED APPLICATIONS

This application is the U.S. National Phase under 35 U.S.C. § 371 of International Patent Application No. PCT/JP2021/017218, filed on Apr. 30, 2021, which in turn claims the benefit of Japanese Patent Application No. 2020-086103, filed on May 15, 2020, the entire content of each of which is incorporated herein by reference.

TECHNICAL FIELD

The present disclosure relates to a solid electrolytic capacitor element and a solid electrolytic capacitor.

BACKGROUND ART

A solid electrolytic capacitor includes a solid electrolytic capacitor element, a resin package body or a case in which the solid electrolytic capacitor element is sealed, and an external electrode that is electrically connected to the solid electrolytic capacitor element. The solid electrolytic capacitor element includes an anode body, a dielectric layer formed at the surface of the anode body, and a cathode portion that covers at least a part of the dielectric layer. The cathode portion includes a solid electrolyte layer that contains a conductive polymer and a dopant and covers at least a part of the dielectric layer.

PTL 1 proposes a method for manufacturing a solid electrolytic capacitor that includes a step of forming an auxiliary conductive layer, and a step of forming a conductive polymer layer on the auxiliary conductive layer through electrolytic polymerization using an electrolytic polymerization liquid for formation of a conductive polymer, these steps being for forming a conductive polymer layer on a valve metal provided with a dielectric oxide coating thereon. The electrolytic polymerization liquid for formation of a conductive polymer is obtained by dissolving a polymerizable monomer and a compound serving as a supporting electrolyte represented by a certain formula.

CITATION LIST

Patent Literature

[PTL 1] Japanese Laid-Open Patent Publication No. 2014-175424

SUMMARY OF INVENTION

Technical Problem

Solid electrolytic capacitors may be exposed to a high-temperature environment. Accordingly, high thermal stability is required for solid electrolytic capacitors and solid electrolytic capacitor elements.

Solution to Problem

A first aspect of the present disclosure relates to a solid electrolytic capacitor element that includes an anode body, a dielectric layer formed at a surface of the anode body, and a cathode portion that covers at least a part of the dielectric layer,
    wherein the cathode portion includes a solid electrolyte layer that covers at least a part of the dielectric layer, and
    a solid electrolyte included in the solid electrolyte layer has a weight reduction ratio of 3% or less when measured through thermogravimetric analysis in which the solid electrolyte is heated to 180° C., is kept at 180° C. for 20 minutes, is cooled from 180° C. to 30° C., and is then heated from 30° C. to 260° C. at a rate of 20° C./min.

A second aspect of the present disclosure relates to a solid electrolytic capacitor element that includes an anode body, a dielectric layer formed at a surface of the anode body, and a cathode portion that covers at least a part of the dielectric layer,
    wherein the cathode portion includes a solid electrolyte layer that covers at least a part of the dielectric layer,
    the solid electrolyte layer includes a conductive polymer and a dopant component,
    the dopant component includes an aromatic compound in which an aromatic ring has an electron-withdrawing functional group and an electron-donating functional group,
    the aromatic compound has a first functional group, which is a sulfo group, and a second functional group, which is a carboxy group, at least, as the electron-withdrawing functional group, and a third functional group, which is at least one selected from the group consisting of a hydroxy group and an alkoxy group, as the electron-donating functional group, and
    relationships $n1 \geq 1$, $n2 \geq 1$, $n3 \geq 1$, and $(n1+n2+n3) \geq 4$ are satisfied, where $n1$, $n2$, and $n3$ represent the number of the first functional groups, the number of the second functional groups, and the number of the third functional groups in one molecule of the aromatic compound, respectively.

A third aspect of the present disclosure relates to a solid electrolytic capacitor that includes at least one solid electrolytic capacitor element as described above.

Advantageous Effects of Invention

It is possible to provide a solid electrolytic capacitor element having excellent thermal stability, and a solid electrolytic capacitor that includes the solid electrolytic capacitor element.

BRIEF DESCRIPTION OF DRAWINGS

FIG. 1 A schematic cross-sectional view of a solid electrolytic capacitor according to one embodiment of the present disclosure.

DESCRIPTION OF EMBODIMENTS

While novel features of the present invention are set forth particularly in the appended claims, the present invention, both as to organization and content, will be better understood and appreciated, along with other objects and features thereof, from the following detailed description taken in conjunction with the drawings.

If air enters the inside of a solid electrolytic capacitor, water or oxygen included in the air may act to degrade a dopant component or oxidatively deteriorate a conductive polymer to reduce the conductivity of a solid electrolyte layer in some cases. A decrease in conductivity of the solid electrolyte layer results in a decrease in performance of the solid electrolytic capacitor, such as an increase in equivalent series resistance (ESR) of the solid electrolytic capacitor or a decrease in capacitance thereof. The degrees of degradation of the dopant component and oxidative deterioration of the conductive polymer are noticeably increased particularly in a high-temperature environment. The solid electrolytic capacitor may be used in a high-temperature environment in some applications. In general, the solid electrolytic capacitor is soldered to a substrate through a reflow step in which the solid electrolytic capacitor is exposed to a high temperature. If the dopant component is easy to degrade, a large amount of gas is generated in the reflow step, and thus airtightness is reduced, resulting in a decrease in reliability of the solid electrolytic capacitor. Accordingly, a solid electrolytic capacitor element and solid electrolytic capacitor having excellent thermal stability in which the degradation of the dopant component and the oxidative deterioration of the conductive polymer are suppressed even in a high-temperature environment, are in demand.

In consideration of the matters above, in the solid electrolytic capacitor element according to the first aspect of the present disclosure, the solid electrolyte included in the solid electrolyte layer has a weight reduction ratio of 3% or less when measured through thermogravimetric analysis in which the solid electrolyte is heated to 180° C., is kept at 180° C. for 20 minutes, is cooled from 180° C. to 30° C., and is then heated from 30° C. to 260° C. at a rate of 20° C./min.

With the first aspect of the present disclosure, the above-mentioned weight reduction ratio of the solid electrolyte is as low as 3% or less, and thus the generation of gas under heating conditions corresponding to the reflow step is suppressed. Accordingly, a decrease in airtightness of the solid electrolytic capacitor in the reflow step is suppressed. Even when the solid electrolytic capacitor is exposed to a high-temperature environment, the generation of gas is suppressed and high airtightness is ensured, thus making it possible to reduce fluctuations in the capacitor performance. Also, even when the solid electrolytic capacitor element and the solid electrolytic capacitor are exposed to a high-temperature environment, the deterioration of the solid electrolyte is suppressed, thus making it possible to suppress a decrease in capacitance or an increase in ESR. Therefore, the solid electrolytic capacitor and the solid electrolytic capacitor element have high thermal stability, thus making it possible to ensure high reliability. According to the present disclosure, the above-mentioned weight reduction ratio can be reduced to 2.5% or less or 2% or less, and can also be further reduced to even less than 1% or 0.8% or less (or 0.5% or less).

In the solid electrolytic capacitor element according to the first aspect, a dopant component that includes an aromatic compound in which an aromatic ring has an electron-withdrawing functional group and optionally an electron-donating functional group may be used in the solid electrolyte layer. Here, this aromatic compound satisfies the relationship $(m1-m2) \geq 2$ where $m1$ and $m2$ represent the number of the electron-withdrawing functional groups and the number of the electron-donating functional groups in one molecule of the aromatic compound, respectively. Such an aromatic compound may also be referred to as a "dopant IA".

In the case where the dopant includes an aromatic ring having two or more electron-withdrawing functional groups, the dopant is likely to firmly coordinate to the conductive polymer, and de-doping tends to be suppressed even in a high-temperature environment, thus making it likely that high conductivity of the solid electrolyte layer is ensured. On the other hand, the electron-donating functional group has an effect of capturing an oxygen radical. In the case where the dopant has the electron-donating functional group, when the dopant coordinates to the conductive polymer due to the effect of the electron-withdrawing functional group, the electron-donating functional group can be located near the conductive polymer. Since the electron-donating functional group can capture an oxygen radical near the conductive polymer, the oxidative deterioration of the conductive polymer can be effectively reduced even in a high-temperature environment. However, if the electron density of the aromatic ring, particularly the electron density of a carbon atom on which the electron-withdrawing functional group is substituted, increases, electrophilic substitution of the electron-withdrawing functional group is likely to occur on this carbon atom, and de-doping is likely to proceed due to elimination of the electron-withdrawing functional group. In the case of using the dopant IA, the relationship $(m1-m2) \geq 2$ is satisfied where $m1$ represents the number of the electron-withdrawing functional groups and $m2$ represents the number of the electron-donating functional groups, and therefore, even when the dopant IA has an electron-donating functional group, an excellent effect of suppressing de-doping is obtained. In addition, it is possible to suppress a decrease in capacitance or an increase in ESR even when the solid electrolytic capacitor element is exposed to a high-temperature environment. Therefore, it is possible to ensure high thermal stability and high reliability of the solid electrolytic capacitor element and the solid electrolytic capacitor.

In the solid electrolytic capacitor element according to the second aspect of the present disclosure, a dopant component that includes an aromatic compound in which an aromatic ring has a first functional group, which is a sulfo group, a second functional group, which is a carboxy group, and a third functional group, which is at least one selected from the group consisting of a hydroxy group and an alkoxy group is used in the solid electrolyte layer. Here, this aromatic compound satisfies relationships $n1 \geq 1$, $n2 \geq 1$, $n3 \geq 1$, and $(n1+n2+n3) \geq 4$ where $n1$, $n2$, and $n3$ represent the number of the first functional groups, the number of the second functional groups, and the number of the third functional groups in one molecule of the aromatic compound, respectively. Such an aromatic compound may also be referred to as a "dopant IB".

In this specification, the dopant IA and the dopant IB may be collectively referred to merely as a "first dopant". Also, at least one selected from the group consisting of the dopant IA and the dopant IB may be referred to as a "first dopant". The first dopant is at least the dopant IA in the first aspect, and the first dopant is at least the dopant IB in the second aspect.

With the second aspect of the present disclosure, the dopant IB is a compound in which an aromatic ring (e.g., a benzene ring or a naphthalene ring) has the electron-withdrawing first functional group and second functional group, and is thus likely to firmly coordinate to the conductive polymer, and de-doping is suppressed even in a high-temperature environment, thus making it easy to ensure high conductivity of the solid electrolyte layer. Also, the dopant IB has excellent hydrolysis resistance due to such a structure, and thus degradation in a high-temperature environment is suppressed. Accordingly, the dopant IB has high thermal stability. In the dopant IB, the sum of the numbers of the first to third functional groups ($=n1+n2+n3$) is greater than or equal to 4. That is to say, the number of at least one of the first to third functional groups is greater than or equal to 2. In the case where the number of at least one of the first functional group and the second functional group is greater than or equal to 2, much higher thermal stability of the dopant IB is likely to be ensured. Also, the dopant IB has the electron-donating third functional group in addition to the first functional group and the second functional group. The third functional group has an effect of capturing an oxygen radical. When the dopant IB coordinates to the conductive polymer due to the effects of the first functional group, the second functional group, and the like, the third functional group can be located near the conductive polymer. Since the third functional group can capture an oxygen radical near the conductive polymer, the oxidative deterioration of the conductive polymer can be effectively reduced even in a high-temperature environment. In the case where the number of the third functional groups is greater than or equal to 2, the effect of capturing an oxygen radical is enhanced, and thus the effect of reducing the oxidative deterioration of the conductive polymer is further enhanced. As described above, in the present disclosure, using a dopant component that includes the dopant IB reduces the degradation of the dopant component and the oxidative deterioration of the conductive polymer in a high-temperature environment. Therefore, it is possible to ensure excellent thermal stability of the solid electrolytic capacitor element and the solid electrolytic capacitor. Also, the dopant IB has excellent hydrolysis resistance, and thus the solid electrolyte layer is less likely to be affected by water in a high-temperature environment. Accordingly, it is also possible to enhance moisture resistance properties of the solid electrolytic capacitor element and the solid electrolytic capacitor.

Also, with the second aspect of the present disclosure, the degradation of the dopant component is suppressed, thus making it possible to reduce the amount of gas generated in the reflow step. The weight reduction ratio of the solid electrolyte layer included in such a solid electrolytic capacitor is small under heating conditions corresponding to the reflow step. For example, the solid electrolyte included in the solid electrolyte layer has a weight reduction ratio of 3% or less when measured through thermogravimetric analysis in which the solid electrolyte is heated to 180° C., is kept at 180° C. for 20 minutes, is cooled from 180° C. to 30° C., and is then heated from 30° C. to 260° C. at a rate of 20° C./min. As described above, according to the present disclosure, the generation of gas under heating conditions corresponding to the reflow step is suppressed, and thus a decrease in airtightness of the solid electrolytic capacitor in the reflow step is suppressed. Even when the solid electrolytic capacitor is exposed to a high-temperature environment, the generation of gas is suppressed and high airtightness is ensured, and the oxidative deterioration of the conductive polymer is suppressed, thus making it possible to suppress a decrease in capacitance or an increase in ESR. Therefore, it is possible to ensure high reliability of the solid electrolytic capacitor element and the solid electrolytic capacitor. According to the present disclosure, the above-mentioned weight reduction ratio can be reduced to 2.5% or less or 2% or less, and can also be reduced to even less than 1% or 0.8% or less (or 0.5% or less). Accordingly, it is possible to ensure excellent reliability of the solid electrolytic capacitor.

The weight reduction ratio of the solid electrolyte can be determined using thermogravimetric analysis according to the following procedure. First, the solid electrolytic capacitor element is removed from the solid electrolytic capacitor, and a solid electrolyte sample is prepared by scraping the solid electrolyte layer. The sample is set in a thermogravimetric analyzer, is heated from room temperature (a temperature of 20° C. or higher and 35° C. or lower) to 180° C., is kept at 180° C. for 20 minutes, and is cooled from 180° C. to 30° C. Then, the weight w0 of the cooled sample is measured. Subsequently, the thermogravimetric analyzer is used to heat the sample from 30° C. to 260° C. at a rate of 20° C./min and measure the weight w1 of the heated sample. The weight reduction amount Δw ($=w0-w1$) of the sample heated from 30° C. to 260° C. is determined, and the ratio (%) of Δw to w0, which is taken as 100%, is calculated and is taken as the weight reduction ratio of the solid electrolyte layer. All the thermogravimetric analyses are performed under a flow of nitrogen gas. An example of the thermogravimetric analyzer is a simultaneous thermogravimetric analyzer (NEXTA STA300) manufactured by Hitachi High-Tech Science Corporation.

Hereinafter, the solid electrolytic capacitor and the solid electrolytic capacitor element (which may be referred to merely as a "capacitor element" hereinafter) of the present disclosure will be described more specifically with reference to the drawing as needed.

[Solid Electrolytic Capacitor]

The solid electrolytic capacitor includes one or two or more capacitor elements. It is sufficient that at least one capacitor element included in the solid electrolytic capacitor has the solid electrolyte layer that includes the first dopant. The ratio of the number of the capacitor elements having the solid electrolyte layer that includes the first dopant to the total number of the capacitor elements included in the solid electrolytic capacitor is preferably 50% or more, and more preferably 75% or more. It is further preferred that all of the capacitor elements included in the solid electrolyte capacitor include the first dopant.

(Capacitor Element)
(Anode Body)

An anode body can include a valve metal, an alloy containing a valve metal, a compound containing a valve metal, or the like. These materials can be used alone or in combination of two or more. Preferred examples of the valve metal include aluminum, tantalum, niobium, and titanium. An anode body with a porous surface is obtained by, for example, roughening the surface of a substrate (e.g., a foil-shaped substrate or a plate-shaped substrate) that includes a valve metal, through etching. The surface can be roughened, for example, by an etching treatment. The anode body may also be constituted by a molded article of particles including a valve metal or a sintered article thereof. The sintered article has a porous structure.

(Dielectric Layer)

A dielectric layer is an insulating layer that is formed so as to cover at least a part of the anode body and that functions as a dielectric. The dielectric layer is formed through anodic oxidation caused by performing chemical conversion treatment or the like on the valve metal on the surface of the anode body. It is sufficient that the dielectric layer is formed so as to cover at least a part of the anode body. In general, the dielectric layer is formed at the surface of the anode body. The dielectric layer is formed on the porous surface of the anode body and thus extends along the inner wall surfaces of the pores and pits at the surface of the anode body.

The dielectric layer includes a valve metal oxide. For example, a dielectric layer includes $Ta_2O_5$ when tantalum is used as the valve metal, and a dielectric layer includes $Al_2O_3$ when aluminum is used as the valve metal. Note that there is no limitation to such a dielectric layer as long as the dielectric layer functions as a dielectric.

(Cathode Portion)

A cathode portion includes at least a solid electrolyte layer that covers at least a part of the dielectric layer. In general, the cathode portion is formed at the surface of at least a portion of the anode body via the dielectric layer. The cathode portion may include a solid electrolyte layer and a cathode lead-out layer that covers at least a part of the solid electrolyte layer. Hereinafter, the solid electrolyte layer and the cathode lead-out layer will be described.

(Solid Electrolyte Layer)

The solid electrolyte layer is formed on the surface of the anode body via the dielectric layer so as to cover the dielectric layer. The solid electrolyte layer need not necessarily cover the entire dielectric layer (entire surface thereof), and need only be formed so as to cover at least a part of the dielectric layer. The solid electrolyte layer constitutes at least a part of the cathode portion in the solid electrolytic capacitor.

The solid electrolyte layer includes a conductive polymer and a dopant component.

(Conductive Polymer)

Examples of the conductive polymer include known conductive polymers used in solid electrolytic capacitors, such as π-conjugated conductive polymers. Examples of the conductive polymer include polymers that include polypyrrole, polythiophene, polyaniline, polyfuran, polyacetylene, polyphenylene, polyphenylenevinylene, polyacene, and polythiophenevinylene as their basic skeletons. Out of these, the polymers that include polypyrrole, polythiophene, or polyaniline as their basic skeletons are preferable. The above-mentioned polymers also include homopolymers, copolymers of two or more monomers, and derivatives thereof (e.g., substitution products having a substituent). For example, polythiophene includes poly(3,4-ethylenedioxythiophene) and the like.

The conductive polymers may be used alone or in combination of two or more.

The weight average molecular weight (Mw) of the conductive polymer is, for example, 1,000 or more and 1,000,000 or less, but there is no particular limitation thereto.

In this specification, the weight average molecular weight (Mw) is a value in terms of polystyrene obtained through gel permeation chromatography (GPC) measurement. Note that the GPC measurement is usually performed using a polystyrene gel column and water/methanol (volume ratio: 8/2) serving as a mobile phase.

(Dopant Component)

It is sufficient that the dopant component includes at least the first dopant, and the dopant component may further include a second dopant other than the first dopant as needed. The ratio of the first dopant in the dopant component is, for example, 50 mass % or more, and may be 75 mass % or more, 90 mass % or more, or 95 mass % or more. The ratio of the first dopant in the dopant component is 100 mass % or less. The dopant component may include only the first dopant. Also, the ratio of the dopant IA in the dopant component may be set to be in the above-mentioned range. The ratio of the dopant IB in the dopant component may be set to be in the above-mentioned range. In the first aspect, the dopant component may include only the dopant IA. In the second aspect, the dopant component may include only the dopant IB.

(First Dopant)

Examples of the aromatic ring included in the first dopant include a benzene ring, a naphthalene ring, an anthracene ring, and a phenanthrene ring. The number of carbon atoms in the aromatic ring is, for example, 6 or more and 20 or less, and may be 6 or more and 14 or less, or 6 or more and 10 or less. In the case of the benzene ring or naphthalene ring, the molecular size is relatively small, and thus the first dopant molecule is likely to come close to the conductive polymer, so that the positions of a plurality of electron-withdrawing functional groups are likely to be relatively close thereto. Therefore, the first dopant is likely to firmly coordinate to the conductive polymer, thus making it much easier to ensure high conductivity of the solid electrolyte layer.

The first dopant has a plurality of functional groups on the aromatic ring. The plurality of functional groups include at least an electron-withdrawing functional group. The plurality of functional groups may further include an electron-donating functional group. One molecule of the first dopant includes two or more electron-withdrawing functional groups.

Examples of the electron-withdrawing functional group include a sulfo group, a carboxy group, a nitro group, a cyano group, an aldehyde group, an acyl group, a tosyl group, and halogen atoms (e.g., a fluoro group, a chloro group, a bromo group, and an iodo group). Out of these electron-withdrawing functional groups, a sulfo group (first functional group) and a carboxy group (second functional group) are preferable from the viewpoint of achieving higher capacitor performance.

A hydroxy group and an alkoxy group are preferable as the electron-donating functional group (third functional group). In the case where the first dopant includes a plurality of third functional groups, each third functional group may be a hydroxy group or an alkoxy group. The number of carbon atoms in the alkoxy group is, for example, in a range of 1 to 10, and may be in a range of 1 to 6. The third functional group is preferably a hydroxy group or an alkoxy group having 1 to 4 carbon atoms because a higher oxygen radical capturing effect is likely to be obtained. The alkoxy group may be a linear alkoxy group or a branched alkoxy group. Specific examples of the alkoxy group include a methoxy group, an ethoxy group, an n-propoxy group, an isopropoxy group, an n-butoxy group, an isobutoxy group, a sec-butoxy group, a tert-butoxy group, a hexyloxy group, a 2-ethyl-hexyloxy group, and an octoxy group, but there is no limitation thereto.

A sulfo group, which is the first functional group, may be included in the solid electrolyte layer in a free form ($-SO_3H$), an anionic form ($-SO_3^-$), a salt form, or a form binding to or interacting with the conductive polymer. In this specification, all these forms of sulfo groups may be collectively referred to merely as a "sulfo group". Similarly, a carboxy group may be included in the solid electrolyte layer in a free form ($-COOH$), an anionic form ($-COO^-$), a salt form, or in a form binding to or interacting with the conductive polymer. In this specification, all these forms of carboxy groups may be collectively referred to merely as a "carboxy group". Moreover, a hydroxy (in other words, a phenolic hydroxy group), which is the third functional group, may be included in a free form ($-OH$), an anionic form ($-O^-$), or a salt form. Note that the salt may be a salt of a sulfonate anion or carboxylate anion and any of organic bases (e.g., organic amines and organic ammoniums) and inorganic bases (e.g., metal hydroxides and ammonia).

In the case where the first dopant has two or more first functional groups, at least some of the first functional groups may be in the same form, or all the first functional groups may be in different forms. In the case where the first dopant has two or more second functional groups, at least some of the two or more second functional groups may be in the same form, or all the second functional groups may be in different forms. In the case where the first dopant has two or more third functional groups, at least some of the two or more third functional groups may be in the same form, and all the third functional groups may be in different forms.

The number $m1$ of the electron-withdrawing functional groups in one molecule of the dopant IA satisfies the relationship $m1 \geq 2$, and may satisfy the relationship $m1 \geq 3$ or the relationship $m1 \geq 4$. The upper limit of the number $m1$ can be determined in accordance with the number of carbon atoms constituting the aromatic ring. The number $m1$ may also satisfy the relationship $m1 \leq 6$ or the relationship $m1 \leq 4$. The upper limit value and the lower limit value can be combined in any combinations.

The number $n1$ of the first functional groups in the first dopant (specifically, the dopant IA or dopant IB) satisfies, for example, the relationship $n1 \geq 1$, and may satisfy the relationship $n1 \geq 2$. The number $n2$ of the second functional groups satisfies, for example, the relationship $n2 \geq 1$, and may satisfy the relationship $n2 \geq 2$. When at least one of the relationships $n1 \geq 2$ and $n2 \geq 2$ is satisfied, the thermal stability of the first dopant can be further enhanced. In the case where the relationship $n1 \geq 2$ is satisfied, the first dopant binds to the conductive polymer with higher binding force, and therefore, de-doping is suppressed even in a high-temperature environment, which is more advantageous in ensuring high conductivity of the solid electrolyte layer. In the case where the relationship $n2 \geq 2$ is satisfied, the hydrolysis resistance of the first dopant can be further enhanced, and thus an effect of suppressing degradation of the first dopant even in a high-temperature environment is further enhanced. Therefore, this is advantageous in further enhancing the thermal stability of the solid electrolyte layer.

The number $m2$ of the electron-donating functional groups (or the number $n3$ of the third functional groups) in one molecule of the dopant IA is determined in accordance with the number $m1$ of the electron-withdrawing functional groups such that the relationship $(m1-m2) \geq 2$ is satisfied. The number $m2$ (or $n3$) may satisfy the relationship $m2 \leq 1$ (or $n3 \leq 1$). In the case where the numbers and kinds of electron-withdrawing functional groups are the same, when the number $m2$ of the electron-donating functional groups (or the number $n3$ of the third functional groups) is greater than or equal to 1, the weight reduction ratio tends to be lower compared with the case where the number $m2$ (or $n3$) is 0. It is preferable that the dopant IA includes an electron-donating functional group ($m2 \geq 1$ (or $n3 \geq 1$)) from the viewpoint of further reducing the weight reduction ratio. In this case, $m2$ (or $n3$) may be 1.

It is sufficient that the aromatic ring (e.g., the above-mentioned aromatic ring such as a benzene ring or a naphthalene ring) in the dopant IB has the first to third functional groups such that the numbers $n1$, $n2$, and $n3$ of these functional groups satisfy the relationships $n1 \geq 1$, $n2 \geq 1$, $n3 \geq 1$, and $(n1+n2+n3) \geq 4$. In the dopant IB, the upper limit of $(n1+n2+n3)$ can be determined in accordance with the number of carbon atoms constituting the aromatic ring. For example, when the aromatic ring is a benzene ring, the relationship $(n1+n2+n3) \leq 6$ is satisfied, and when the aromatic ring is a naphthalene ring, the relationship $(n1+n2+n3) \leq 8$ is satisfied. The relationship $(n1+n2+n3) \leq 6$ may be satisfied irrespective of the kind of aromatic ring.

The number $n3$ of the third functional groups in the dopant IB satisfies the relationship $n3 \geq 1$, and may satisfy the relationship $n3 \geq 2$. In the case where the relationship $n3 \geq 2$ is satisfied, the effect of capturing an oxygen radical is further enhanced, and therefore, such a case is more advantageous from the viewpoint of suppressing the oxidative deterioration of the conductive polymer.

In the case where the first dopant has the first functional group, there is no particular limitation on the position of the first functional group in the aromatic ring. In the case where the first dopant has a naphthalene ring as the aromatic ring, it is preferable that the first dopant has at least the first functional group at a position of at least one selected from the group consisting of the 2-position, the 3-position, the 6-position, and the 7-position in the naphthalene ring. This is advantageous in enhancing the conductivity of the solid electrolyte layer because the first dopant is more likely to come close to the conductive polymer.

There is no particular limitation on the positions of the first functional group and the second functional group in the aromatic ring (e.g., a benzene ring or naphthalene ring) of the first dopant. In the case where the first dopant has a benzene ring as the aromatic ring, the position of the second functional group in the benzene ring may be any of the ortho-position, the meta-position, and the para-position relative to the first functional group. It is preferable that the second functional group is located at the meta-position relative to the first functional group in the benzene ring because the hydrolysis resistance of the first dopant is likely to be enhanced. In the case where the first dopant has two or more first functional groups, it is preferable that the second functional group is located at the meta-position relative to at least one of the first functional groups. In the case where the first dopant has two or more second functional groups, it is preferable that at least one of the second functional groups is located at the meta-position relative to the first functional group.

In the case where the first dopant includes the first functional group and an electron-donating functional group (or the third functional group), there is no particular limitation on the position of the electron-donating functional group (or the third functional group) in the aromatic ring (e.g., a benzene ring or a naphthalene ring). In the case where the first dopant has a benzene ring as the aromatic ring, the position of the electron-donating functional group (or the third functional group) in the benzene ring may be any of the ortho-position, the meta-position, and the para-position relative to the first functional group. In the case where the position of the electron-donating functional group (or the third functional group) is the ortho-position or the meta-position relative to the first functional group, it is conceivable that an effect of suppressing oxidative deterioration of the conductive polymer can be further enhanced because an oxygen radical can be easily captured at a place closer to the conductive polymer. The position of the electron-donating functional group (or the third functional group) may be the ortho-position or the para-position relative to the first functional group. In this case, the functional groups can be easily introduced into a benzene ring, and furthermore, it is easy to achieve a good balance between high hydrolysis resistance provided by the electron-withdrawing functional groups (the first functional group and the second functional group) and high oxygen radical capturing effect provided by the electron-donating functional group (or the third functional group). Therefore, this is advantageous in further enhancing the thermal stability of the solid electrolyte layer.

As the first dopant having a naphthalene ring as the aromatic ring, at least one selected from the group consisting of an aromatic compound in which the number $m1$ of the electron-withdrawing functional groups satisfies the relationship m1≥4, an aromatic compound in which the number n1 of sulfo groups satisfies the relationship n1≥2 and the number n2 of carboxy groups satisfies the relationship n2=0, and the dopant IB (e.g., an aromatic compound in which the number m2 (or n3) of the electron-donating functional groups satisfies the relationship m2≥1 (or n3≥1)) may be used. Using these compounds makes it likely that a lower weight reduction ratio is obtained. From the same viewpoint, a dopant IA other than 6,8-disulfo-2-naphthoic acid, 5,7-disulfo-2-naphthoic acid, 3,6-disulfo-1-naphthoic acid, 4,8-disulfo-2-naphthoic acid, and 3,7-disulfo-2-naphthoic acid may be used as the dopant IA having a naphthalene ring as the aromatic ring. These disulfo naphthoic acids have no substituents other than two sulfo groups and one carboxy group.

The first dopant may have a first substituent other than the electron-withdrawing functional group and the electron-donating functional group (e.g., the first to third functional groups) as needed. Also, the first dopant may be a compound having a non-aromatic ring Z condensed to the aromatic ring (e.g., a benzene ring or a naphthalene ring). In the first dopant having such a structure, out of carbon atoms constituting the ring of the aromatic ring (e.g., carbon atoms at the 1- to 6-positions in a benzene ring), two carbon atoms on which the electron-withdrawing functional group and the electron-donating functional group (e.g., the first to third functional groups) are not substituted are coupled with an aliphatic chain. The aliphatic chain may be a saturated chain or an unsaturated chain. The aliphatic chain in the first dopant may have one or two or more second substituents. The first dopant (or the dopant IA or the dopant IB) also encompasses a compound in which the aromatic ring (e.g., a benzene ring or a naphthalene ring) has such a first substituent in addition to the electron-withdrawing functional group and the electron-donating functional group (e.g., the first to third functional groups), and a compound in which the ring Z that may have the second substituent is condensed to the aromatic ring described above.

Examples of the first substituent that may be included in the first dopant on its aromatic ring (e.g., a benzene ring or a naphthalene ring) include hydrocarbon groups. In the dopant IB, the first substituent may be an electron-donating group other than the third functional group or an electron-withdrawing group other than the first functional group and the second functional group, and is preferably a hydrocarbon group because the effects of the first to third functional groups are likely to be exhibited in a well-balanced manner. The hydrocarbon group may be any of an aliphatic hydrocarbon group, an alicyclic hydrocarbon group, and an aromatic hydrocarbon group. The hydrocarbon group is preferably an aliphatic hydrocarbon group because the first dopant is likely to coordinate to the conductive polymer. The number of carbon atoms in the aliphatic hydrocarbon group is, for example, in a range of 1 to 10, and may be in a range of 1 to 6 or 1 to 4. The aliphatic hydrocarbon group may be a saturated group or an unsaturated group. Examples of the aliphatic hydrocarbon group include alkyl groups, alkenyl groups, and dienyl groups.

The number n4 of the first substituents may be determined in accordance with the number of carbon atoms constituting the aromatic ring, and the numbers of the electron-withdrawing functional groups and the electron-donating functional groups. The number n4 of the first substituents is, for example, 0 or more and 6 or less, and may be 0 or more and 4 or less. In the case where the first dopant has a benzene ring as the aromatic ring, the number n4 of the first substituents is 0, 1, or 2. In the case where the first dopant has two or more first substituents, at least two first substituents may be the same, or all the first substituents may be different. It is also preferable that the first dopant has no first substituents because the effects of the electron-withdrawing functional group and the electron-donating functional group (e.g., the first to third functional groups) are likely to be exhibited in a well-balanced manner.

In the case where the first dopant includes the ring Z, examples of the second substituent that may be included in the first dopant on the aliphatic chain forming the ring Z include the groups described as the electron-withdrawing functional group, the groups described as the first to third functional groups, and the groups described as the first substituent. The number n5 of the second substituents in the first dopant may be 1, or greater than or equal to 2. In the case where the first dopant has two or more second substituents, some of the second substituents may be the same, or all the second substituents may be different.

It is preferable that the first dopant does not have the non-aromatic ring Z as mentioned above because the first dopant is likely to come close to the conductive polymer.

The dopant component may include one kind of first dopant, or two or more kinds of first dopants. The dopant component may include one kind of dopant IA, or two or more kinds of dopants IA. The dopant component may include one kind of dopant IB, or two or more kinds of dopants IB. The dopant component may include at least one kind of dopant IB, and at least one kind of dopant IA that is not encompassed in the dopant IB.

(Second Dopant)

It is sufficient that the second dopant is a dopant other than the first dopant, and an example thereof is at least one selected from the group consisting of anions and polyanions.

Examples of the anions include a sulfate ion, a nitrate ion, a phosphate ion, a borate ion, organic sulfonate ions, and a carboxylate ion, but there is no particular limitation thereto. Examples of a dopant that generates a sulfonate ion include p-toluenesulfonic acid and naphthalenesulfonic acid.

Examples of the polyanions include polymer-type polysulfonic acids and polymer-type polycarboxylic acids. Examples of the polymer-type polysulfonic acids include polyvinylsulfonic acid, polystyrenesulfonic acid, polyallylsulfonic acid, polyacrylsulfonic acid, and polymethacrylsulfonic acid. Examples of the polymer-type polycarboxylic acids include polyacrylic acid and polymethacrylic acid. The polyanions also include polyestersulfonic acid and phenolsulfonate novolac resin. However, the polyanions are not limited thereto.

The anions and the polyanions may be included in the solid electrolyte layer in the form of salt. In the solid electrolyte layer, the anions and the polyanions may bind to or interact with the conductive polymer to form a conductive polymer complex together with the conductive polymer.

The dopant component may include one kind of second dopant, or two or more kinds of second dopants.

With the solid electrolytic capacitor element of the present disclosure, as described above, it is possible to reduce the weight reduction ratio of the solid electrolyte measured through the thermogravimetric analysis. The weight reduction ratio of the solid electrolyte can be controlled by adjusting the kinds of dopants, the ratios of the dopants to the conductive polymer, the polymerization conditions for forming the conductive polymer (e.g., the polymerization potential for electrolytic polymerization, and the concentration of the precursor of the conductive polymer and the concentrations of the dopants in a polymerization processing liquid), and the like.

(Other Configurations)

The amount of the dopant component included in the solid electrolyte layer is, for example, 10 to 1,000 parts by mass, and may be 20 to 500 parts by mass or 50 to 200 parts by mass, with respect to 100 parts by mass of the conductive polymer.

The solid electrolyte layer may be constituted by a single layer or a plurality of layers. In the case where the solid electrolyte layer is constituted by a plurality of layers, these layers may include the same conductive polymer or different conductive polymers. Also, the dopant components included in these layers may have the same composition or different compositions. In the case where the solid electrolyte layer is constituted by a plurality of layers, it is sufficient that at least one of the layers includes the first dopant.

The solid electrolyte layer may further include a known additive and a known conductive material other than the conductive polymer as needed. An example of such a conductive material is at least one selected from the group consisting of conductive inorganic materials such as manganese dioxide, and TCNQ complex salts.

A layer for enhancing adhesion or the like may be provided between the dielectric layer and the solid electrolyte layer.

The solid electrolyte layer is formed by, for example, using a processing liquid that includes a precursor of the conductive polymer and the dopant component to polymerize the precursor on the dielectric layer. The polymerization can be performed through at least either chemical polymerization or electrolytic polymerization. An example of the precursor of the conductive polymer is at least one selected from the group consisting of a monomer, an oligomer, and a prepolymer. The oligomer and the prepolymer have a structure in which, for example, a plurality of monomer units are linked. The precursors may be used alone or in combination of two or more. The solid electrolyte layer may also be formed by applying a processing liquid (e.g., a dispersion or solution) that includes the conductive polymer and the dopant component to the dielectric layer and then drying it. Examples of a dispersion medium (or a solvent) include water, organic solvents, and mixtures thereof. The processing liquid may further include other components such as an additive.

In the case where the processing liquid that includes the precursor of the conductive polymer and the dopant component is used, an oxidant is used to polymerize the precursor as needed. The first dopant may be used as an oxidant, or an oxidant other than the first dopant may be used. The oxidant may be included in the processing liquid as an additive. The oxidant may also be applied to the anode body before or after the processing liquid is brought into contact with the anode body on which the dielectric layer has been formed. Examples of such an oxidant include sulfates, sulfonic acids, and sulfonates. These oxidants can be used alone or in combination of two or more. Examples of the sulfates include salts of metals and a sulfuric acid component including sulfuric acid and persulfuric acid, such as ferric sulfate and sodium persulfate. Examples of the metals included in the salts include alkali metals (e.g., sodium and potassium), iron, copper, chromium, and zinc. Sulfonic acids or sulfonates function as an oxidant as well as a dopant. The sulfonic acids or sulfonates may be the low-molecular-weight sulfonic acids or sulfonates shown as the examples of the second dopant. A compound that can generate $Fe^{3+}$ (e.g., ferric sulfate), persulfate (e.g., sodium persulfate or ammonium persulfate), hydrogen peroxide, or the like may be used as the oxidant. The oxidants can be used alone or in combination of two or more.

The step of forming the solid electrolyte layer through immersion into the processing liquid and polymerization (or drying) may be performed once, or may be repeated a plurality of times. In the repeated steps, the conditions such as the composition and viscosity of the processing liquid may be the same, or at least one condition may be changed.

It is preferable to form the solid electrolyte layer through electrolytic polymerization because it is easy to control the properties of the solid electrolyte. The electrolytic polymerization can be performed by applying a polymerization voltage in a state in which the anode body having the dielectric layer is in contact with (e.g., immersed in) the processing liquid that includes the precursor of the conductive polymer and the dopant component. The polymerization voltage is applied via a power supplying body.

In the electrolytic polymerization, the polymerization voltage is, for example, 1 V or more and 3.5 V or less (or 3 V or less), and may be 2V or more and 3.5 V or less (or 3 V or less). The polymerization voltage is a potential of the power supplying body relative to a reference electrode (silver/silver chloride electrode ($Ag/Ag^+$)).

In the processing liquid, the ratio of the dopant component to the precursor of the conductive polymer is, for example, 0.1 mol or more and 0.75 mol or less, and may be 0.4 mol or more and 0.75 mol or less, per 1 mol of the monomer unit of the conductive polymer.

The temperature at which the electrolytic polymerization is performed is, for example, 5° C. or higher and 60° C. or lower, and may be 15° C. or higher and 35° C. or lower.

(Cathode Lead-Out Layer)

The cathode lead-out layer need only include at least a first layer that is in contact with the solid electrolyte layer and covers at least a part of the solid electrolyte layer, and may include a first layer and a second layer that covers the first layer. Examples of the first layer include a metal foil and a layer that includes conductive particles. An example of the conductive particles is at least one selected from conductive carbon and metal powder. For example, the cathode lead-out layer may be constituted by a first layer formed by a layer that includes conductive carbon, and a second layer formed by a metal foil or a layer that includes metal powder. In the case where a metal foil is used as the first layer, the cathode lead-out layer may be constituted by this metal foil.

The first layer that includes conductive carbon can be formed by, for example, immersing the anode body having the dielectric layer on which the solid electrolyte layer is formed in a dispersion liquid that includes conductive carbon, or applying a paste that includes conductive carbon to the surface of the solid electrolyte layer. Examples of the conductive carbon include graphites such as artificial graphite and natural graphite. A mixture obtained by, for example, dispersing conductive carbon in an aqueous liquid medium is used as the dispersion liquid and the paste.

The second layer formed by a layer that includes metal powder can be formed by, for example, a composition that includes metal powder is layered on the surface of the first layer. For example, a metal paste layer formed using a composition that includes metal powder such as silver particles and a resin (binder resin) can be used as such a second layer. Although a thermoplastic resin can also be used as the resin, it is preferable to use a thermosetting resin such as an imide-based resin or an epoxy resin.

In the case where a metal foil is used as the first layer, although there is no particular limitation on the kind of metal, it is preferable to use a valve metal such as aluminum, tantalum, or niobium, or an alloy that includes a valve metal. The surface of the metal foil may be roughened through etching processing as needed. A chemical conversion coating is provided on the surface of the metal foil, and a coating made of a metal (a heterogenous metal) that is different from the metal forming the metal foil or a non-metal may be provided. Examples of the heterogenous metal and the non-metal include metals such as titanium and non-metals such as carbon (conductive carbon).

A configuration may be employed in which the first layer is constituted by a coating made of the above-mentioned heterogenous metal or non-metal (e.g., conductive carbon), and the second layer is constituted by the above-mentioned metal foil.

The thicknesses of the first layer and the second layer are, for example, 0.1 μm or more and 100 μm or less, and may be 0.5 μm or more and 50 μm or less, or 1 μm or more and 20 μm or less.

(Separator)

In the case where a metal foil is used as the cathode lead-out layer, a separator may be disposed between the metal foil and the anode body. There is no particular limitation on the separator, and a nonwoven fabric that includes fibers made of cellulose, polyethylene terephthalate, vinylon, or polyamide (e.g., an aliphatic polyamide and an aromatic polyamide such as aramid) may be used as the separator.

(Other Configurations)

The solid electrolytic capacitor may be wound type, and may also be chip type or layered type. The solid electrolytic capacitor may include two or more capacitor elements. For example, the solid electrolytic capacitor may include a laminate of two or more capacitor elements. The solid electrolytic capacitor may include two or more wound capacitor elements. It is sufficient that the configuration of the capacitor element is selected in accordance with the type of solid electrolytic capacitor.

In the capacitor element, one end portion of a cathode terminal is electrically connected to the cathode lead-out layer. The cathode terminal is joined to the cathode lead-out layer via, for example, a conductive adhesive applied to the cathode lead-out layer. One end portion of an anode terminal is electrically connected to the anode body. The other end portion of the anode terminal and the other end portion of the cathode terminal are drawn out of the resin package body or case. The other end portion of each terminal exposed from the resin package body or case is used to, for example, solder the terminal to a substrate on which the solid electrolytic capacitor is to be installed.

The capacitor element is sealed in the resin package body or case. For example, the capacitor element and a material resin (e.g., an uncured thermosetting resin and a filler) of the package body may be placed in a mold, and then the capacitor element may be sealed in the resin package body through a transfer molding technique, a compression molding technique, or the like. At this time, a portion on the other end portion side of the anode terminal connected to an anode lead drawn out from the capacitor element, and a portion on the other end portion side of the cathode terminal are exposed from the mold. Moreover, the solid electrolytic capacitor may also be formed by placing the capacitor element in a case with a bottom such that the portion on the other end portion side of the anode terminal and the portion on the other end portion side of the cathode terminal are located near the opening of the case with a bottom, and then sealing the opening of the case with a bottom using a sealing member.

FIG. 1 schematically shows the structure of a solid electrolytic capacitor according to one embodiment of the present disclosure. As shown in FIG. 1, a solid electrolytic capacitor 1 includes a capacitor element 2, a resin package body 3 that seals the capacitor element 2, and an anode terminal 4 and a cathode terminal 5 at least portions of which are exposed to the outside of the resin package body 3. The anode terminal 4 and the cathode terminal 5 can be made of a metal such as copper or a copper alloy. The external shape of the resin package body 3 is a substantially rectangular parallelepiped, and the external shape of the solid electrolytic capacitor 1 is also a substantially rectangular parallelepiped.

The capacitor element 2 includes an anode body 6, a dielectric layer 7 that covers the anode body 6, and a cathode body 8 that covers the dielectric layer 7. The cathode body 8 includes a solid electrolyte layer 9 that covers the dielectric layer 7, and a cathode lead-out layer 10 that covers the solid electrolyte layer 9, and constitutes the above-described cathode portion. In the example shown in the diagram, the cathode lead-out layer 10 has a carbon layer 11 serving as the first layer, and a metal paste layer 12 serving as the second layer. According to the present disclosure, the weight reduction ratio of the solid electrolyte included in the solid electrolyte layer 9 is 3% or less. Alternatively, the solid electrolyte layer 9 includes the conductive polymer and the dopant component that includes the first dopant (e.g., dopant IB). Due to this configuration, the capacitor element 2 and the solid electrolytic capacitor 1 have high thermal stability. Also, it is possible to ensure high reliability of the capacitor element 2 and the solid electrolytic capacitor 1.

The anode body 6 includes a region that faces the cathode body 8, and a region that does not face the cathode body 8. In the region of the anode body 6 that does not face the cathode body 8, an insulating separate layer 13 is formed on a portion adjacent to the cathode body 8 and covers the surface of the anode body 6 in a band-like manner, thereby restricting contact between the cathode body 8 and the anode body 6. Another portion in the region of the anode body 6 that does not face the cathode body 8 is electrically connected to the anode terminal 4 through welding. The cathode terminal 5 is electrically connected to the cathode body 8 via an adhesive layer 14 formed using a conductive adhesive.

A main surface 4S of the anode terminal 4 and a main surface 5S of the cathode terminal 5 are exposed from the same surface of the resin package body 3. These exposed surfaces are used to, for example, solder the terminals to a substrate (not illustrated) on which the solid electrolytic capacitor 1 is to be installed.

EXAMPLES

Hereinafter, the present invention will be specifically described based on examples and comparative examples. However, the present invention is not limited to the following examples.

<<Solid Electrolytic Capacitor A1>>

A solid electrolytic capacitor 1 shown in FIG. 1 (solid electrolytic capacitor A1) was produced according to the following procedure, and the characteristics thereof were evaluated.

(1) Preparation of Anode Body 6

An anode body 6 was produced by roughening both surfaces of an aluminum foil (thickness: 100 μm) serving as a substrate through etching.

(2) Formation of Dielectric Layer 7

A portion on the other end portion side of the anode body 6 was immersed in a chemical conversion liquid, and a D.C. voltage of 70 V was applied thereto for 20 minutes to form a dielectric layer 7 that included aluminum oxide.

(3) Formation of Solid Electrolyte Layer 9

An aqueous solution that includes pyrrole monomer and 4-hydroxy-5-sulfoisophthalic acid (dopant component) was prepared. The concentration of the monomer in this aqueous solution was 0.5 mol/L, and the concentration of 4-hydroxy-5-sulfoisophthalic acid was 0.3 mol/L. Note that 4-hydroxy-5-sulfoisophthalic acid used is represented by the following formula.

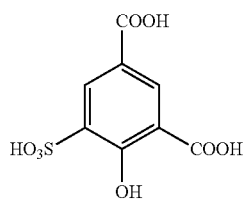 [SMILES: O=C(O)c1cc(C(=O)O)c(O)c(S(=O)(=O)O)c1]

[Chemical Formula 1]

The anode body 6 on which the dielectric layer 7 was formed in (2) above and a counter electrode were immersed in the obtained aqueous solution, and electrolytic polymerization was performed with a polymerization voltage of 3 V (polymerization potential relative to a silver reference electrode) at 25° C. to form a solid electrolyte layer 9.

(4) Formation of Cathode Body 8

The anode body 6 obtained in (3) above on which the solid electrolyte layer 9 was formed was immersed in a dispersion liquid obtained by dispersing graphite particles in water, was removed from the dispersion liquid, and was dried. Thus, a carbon layer 11 was formed on at least the surface of the solid electrolyte layer 9. Drying was performed at 130° C. to 180° C. for 10 to 30 minutes.

Subsequently, a silver paste that included silver particles and a binder resin (epoxy resin) was applied to the surface of the carbon layer 11 and was then heated at 150° C. to 200° C. for 10 to 60 minutes to cure the binder resin. Thus, a metal paste layer 12 was formed. Thereby, a cathode body 8 constituted by the carbon layer 11 and the metal paste layer 12 was formed.

As described above, a capacitor element 2 was produced.

(5) Assembly of Solid Electrolytic Capacitor 1

The cathode body 8 of the capacitor element 2 obtained in (4) above and one end portion of the cathode terminal 5 were joined together via the adhesive layer 14 formed using a conductive adhesive. One end portion of the anode body 6 that protruded from the capacitor element 2 and one end portion of the anode terminal 4 were joined together through laser welding.

Subsequently, a resin package body 3 made of an insulating resin was formed around the capacitor element 2 through mold forming. At this time, the other end portion of the anode terminal 4 and the other end portion of the cathode terminal 5 were drawn out of the resin package body 3.

Thus, the solid electrolytic capacitor A1 was completed. In the same manner as described above, twenty solid electrolytic capacitors A1 in total were produced.

(6) Evaluation

The solid electrolytic capacitors were each evaluated as follows.

(a) Rate of Change in ESR and Rate of Change in Capacitance

An LCR meter for four-terminal measurement was used to measure an initial capacitance (μF) of the solid electrolytic capacitor at a frequency of 120 Hz and an initial ESR (mΩ) thereof at a frequency of 100 kHz, at 20° C. Then, average values (initial capacitance: $c0$, initial ESR: $r0$) of the measured values obtained from the twenty solid electrolytic capacitors were determined.

Subsequently, reflow processing was performed on the solid electrolytic capacitors at 260° C. for 3 minutes. After the reflow processing, an accelerated test was performed by applying a rated voltage to the solid electrolytic capacitors at 145° C. for 500 hours. Then, the capacitance and ESR were measured at 20° C. in the same manner as the measurement of the initial capacitance and initial ESR, and average values (capacitance after accelerated test: $c1$, ESR after accelerated test: $r1$) of the measured values obtained from the twenty solid electrolytic capacitors were determined. The amount of change in capacitance caused by the accelerated test ($=c1-c0$) was determined. The average $c0$ of the initial capacitances was defined as 100%, and the ratio (%) of the amount of change in capacitance was calculated as the rate of change in capacitance ($\Delta$Cap). The amount of change in ESR caused by the accelerated test ($=r1-r0$) was determined. The average $r0$ of the initial ESRs was defined as 100%, and the ratio (%) of the amount of change in ESR was calculated as the rate of change in ESR ($\Delta$ESR).

(b) Weight Reduction Ratio of Heated Solid Electrolyte Layer

In accordance with the above-described procedure, a sample of the solid electrolyte was collected from the solid electrolyte layer of the capacitor element 2 removed from the solid electrolytic capacitor 1, and the weight reduction ratio of this sample was determined.

<<Solid Electrolytic Capacitor A2>>

Capacitor elements and solid electrolytic capacitors A2 were produced and evaluated in the same manner as the solid electrolytic capacitor A1, except that 3-hydroxy-6,8-disulfo-2-naphthoic acid represented by the formula below was used instead of 4-hydroxy-5-sulfoisophthalic acid in (3) of "Solid Electrolytic Capacitor A1".

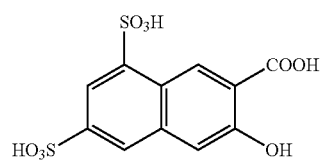

[Chemical Formula 2]

<<Solid Electrolytic Capacitor A3>>

Capacitor elements and solid electrolytic capacitors A3 were produced and evaluated in the same manner as the solid electrolytic capacitor A1, except that 5-sulfoisophthalic acid represented by the formula below was used instead of 4-hydroxy-5-sulfoisophthalic acid in (3) of "Solid Electrolytic Capacitor A1".

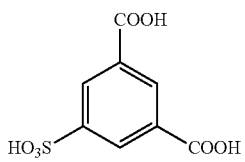

[Chemical Formula 3]

<<Solid Electrolytic Capacitor B1>>

Capacitor elements and solid electrolytic capacitors B1 were produced and evaluated in the same manner as the solid electrolytic capacitor A1, except that 5-sulfosalicylic acid represented by the formula below was used instead of 4-hydroxy-5-sulfoisophthalic acid in (3) of "Solid Electrolytic Capacitor A1".

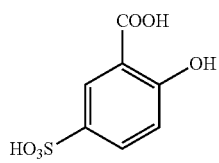

[Chemical Formula 4]

<<Solid Electrolytic Capacitor B2>>

Capacitor elements and solid electrolytic capacitors B2 were produced and evaluated in the same manner as the solid electrolytic capacitor A1, except that 2-naphthalenesulfonic acid represented by the formula below was used instead of 4-hydroxy-5-sulfoisophthalic acid in (3) of "Solid Electrolytic Capacitor A1".

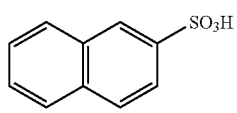 [SMILES: O=S(=O)(O)c1ccc2ccccc2c1]

[Chemical Formula 5]

Table 1 shows the evaluation results of the solid electrolytic capacitors A1 to A3, B1, and B2.

TABLE 1

| Dopant component | | ΔESR (%) | ΔCap (%) | Weight reduction ratio (%) |
|---|---|---|---|---|
| A1 | ![structure with COOH, HO3S, COOH, OH on benzene] | 2.97 | −0.52 | 0.42 |
| A2 | ![structure with SO3H, COOH, HO3S, OH on naphthalene] | 5.91 | −0.95 | 0.84 |
| A3 | ![structure with COOH, HO3S, COOH on benzene] | 34.82 | −4.39 | 1.13 |
| B1 | ![structure with COOH, OH, HO3S on benzene] | 55.98 | −8.3 | 4.07 |
| B2 | ![naphthalene with SO3H] | 50.64 | −6.85 | 3.51 |

As shown in Table 1, in the examples in which the weight reduction ratio of the solid electrolyte was 3% or less, the changes in capacitance and ESR of the solid electrolytic capacitor after the reflow processing were significantly reduced, compared with the comparative examples in which the weight reduction ratio of the solid electrolyte was more than 3%.

<<Solid Electrolytic Capacitors A4 to A6>>

Capacitor elements and solid electrolytic capacitors A4 to A6 were produced in the same manner as the solid electrolytic capacitor A1, except that dopant components shown in Table 2 were used instead of 4-hydroxy-5-sulfoisophthalic acid in (3) of "Solid Electrolytic Capacitor A1". The capacitor elements and the solid electrolytic capacitors were evaluated as in (6)(a) and (6)(b), and in addition, the airtightness reduction rates thereof were evaluated as in (c) below.

(c) Airtightness Reduction Rate

After reflow processing, the solid electrolytic capacitor was cooled to 25° C. The reflow processing was performed under the following conditions: the peak temperature was set to 260° C., and the sample was kept at the peak temperature for 10 seconds and at a temperature of 220° C. or higher for 140 seconds. After the reflow processing and cooling to 25° C. were repeated 3 times, the solid electrolytic capacitor was immersed for 30 seconds in Fluorinert (fluorine-based inert liquid, manufactured by 3M) heated to 120° C. At this time, a bubble generation state of the solid electrolytic capacitor was observed. Twenty solid electrolytic capacitors in total were evaluated, and the number of solid electrolytic capacitors in which bubbles were generated was taken as the airtightness reduction rate.

<<Solid Electrolytic Capacitor B3>>

In (3) of "Solid Electrolytic Capacitor A1", a dopant component shown in Table 2 was used instead of 4-hydroxy-5-sulfoisophthalic acid. The concentration of the dopant component in the aqueous solution was set to 0.5 mol/L. The polymerization voltage in the electrolytic polymerization was set to 4 V (polymerization potential relative to the silver reference electrode). Capacitor elements and solid electrolytic capacitors B3 were produced in the same manner as the solid electrolytic capacitor A1, except the changes above. The capacitor elements and the solid electrolytic capacitors were evaluated as in (6)(a) and (6)(b), and in addition, the airtightness reduction rates thereof were evaluated as in (c) above.

Table 2 shows the evaluation results of the solid electrolytic capacitors A4 to A6 and B3. Table 2 also shows the results obtained by evaluating the solid electrolytic capacitors A1, A3, B1, and B2 in the same manner.

As shown in Table 2, in the case where the weight reduction ratio of the solid electrolyte was 3% or less, the changes in capacitance and ESR of the solid electrolytic capacitor after the reflow processing were significantly reduced, compared with the case where the weight reduction ratio of the solid electrolyte was more than 3%.

TABLE 2

| | Dopant component | (m1 − m2) | ΔESR (%) | ΔCap (%) | Weight reduction ratio (%) | Airtightness reduction rate (per 20 capacitors) |
|---|---|---|---|---|---|---|
| A1 | (benzene with COOH, COOH, HO₃S, OH) | 2 | 2.97 | −0.52 | 0.42 | 0 |
| A3 | (benzene with COOH, HO₃S, COOH) | 3 | 34.82 | −4.39 | 1.13 | 0 |
| A4 | (naphthalene with HO₃S, SO₃H) | 2 | 19.61 | −2.89 | 2.13 | 0 |
| A5 | (naphthalene with SO₃H, HO₃S, SO₃H, SO₃H) | 4 | 9.46 | −2.16 | 1.91 | 0 |
| A6 | (naphthalene with HO₃S, COOH, COOH, SO₃H) | 4 | 13.17 | −2.83 | 1.78 | 0 |
| B1 | (benzene with COOH, OH, HO₃S) | 1 | 55.98 | −8.3 | 4.07 | 20 |
| B2 | (naphthalene with SO₃H) | 1 | 50.64 | −6.85 | 3.51 | 17 |
| B3 | (benzene with COOH, HO₃S, COOH) | 3 | 69.87 | −9.47 | 3.12 | 16 |

In the case where the weight reduction ratio of the solid electrolyte was more than 3%, the airtightness significantly decreased after exposure to a high temperature (B1 to B3). In the case where the dopant component satisfied the relationship (m1−m2)≥2, the weight reduction ratio of the solid electrolyte tended to be as low as 3% or less (comparison of A1 and A3 to A6 with B1 to B3). Also, in the case where the dopant component had the electron-donating functional group (or third functional group), the weight reduction ratio of the solid electrolyte tended to further decrease (comparison of A1 with A3). However, the weight reduction ratio of the solid electrolyte was significantly affected by the type of dopant component as well as the conditions of the solid electrolyte polymerization (comparison of A3 with B3).

Although the present invention has been described in terms of the presently preferred embodiments, it is to be understood that such a disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

INDUSTRIAL APPLICABILITY

According to the present disclosure, a solid electrolytic capacitor element and a solid electrolytic capacitor that have excellent thermal stability are provided. Moreover, a decrease in airtightness of the solid electrolytic capacitor in the reflow step can also be suppressed. Therefore, it is possible to use the solid electrolytic capacitor element and the solid electrolytic capacitor in various applications for which high reliability is required.

REFERENCE SIGNS LIST

1: solid electrolytic capacitor, 2: capacitor element, 3: resin package body, 4: anode terminal, 4S: main surface of anode terminal, 5: cathode terminal, 5S: main surface of cathode terminal, 6: anode body, 7: dielectric layer, 8: cathode body, 9: solid electrolyte layer, 10: cathode lead-out layer, 11: carbon layer, 12: metal paste layer, 13: separate layer, 14: adhesive layer

The invention claimed is:

1. A solid electrolytic capacitor element comprising:
an anode body,
a dielectric layer formed at a surface of the anode body, and
a cathode portion that covers at least a part of the dielectric layer,
wherein:
the cathode portion includes a solid electrolyte layer that covers at least a part of the dielectric layer,
the solid electrolyte layer includes a solid electrolyte,
the solid electrolyte includes a conductive polymer and a dopant component,
the dopant component includes an aromatic compound in which an aromatic ring has a plurality of functional groups,
the plurality of functional groups include an electron-withdrawing functional group, and include an electron-donating functional group or do not include an electron-donating functional group,
a relationship (m1−m2)≥2 is satisfied, where m1 and m2 represent the number of the electron-withdrawing functional groups and the number of the electron-donating functional groups in one molecule of the aromatic compound, respectively, and
the solid electrolyte included in the solid electrolyte layer has a weight reduction ratio of 3% or less when measured through thermogravimetric analysis in which the solid electrolyte is heated to 180° C., is kept at 180° C. for 20 minutes, is cooled from 180° C. to 30° C., and is then heated from 30° C. to 260° C. at a rate of 20° C./min.

2. The solid electrolytic capacitor element according to claim 1,
wherein a relationship m2≤1 is satisfied.

3. The solid electrolytic capacitor element according to claim 1,
wherein the aromatic compound has at least one first functional group, which is a sulfo group, as the electron-withdrawing functional group.

4. A solid electrolytic capacitor comprising at least one solid electrolytic capacitor element, the solid electrolytic capacitor element comprising:
an anode body;
a dielectric layer formed at a surface of the anode body; and
a cathode portion that covers at least a portion of the dielectric layer,
wherein the cathode portion includes a solid electrolyte layer that covers at least a part of the dielectric layer,
the solid electrolyte layer includes a solid electrolyte, and
the solid electrolyte includes a conductive polymer and a dopant component,
the dopant component includes an aromatic compound in which an aromatic ring has an electron-withdrawing functional group and an electron-donating functional group,
the aromatic compound has a first functional group, which is a sulfo group, and a second functional group, which is a carboxy group, at least, as the electron-withdrawing functional group, and a third functional group, which is at least one selected from the group consisting of a hydroxy group and an alkoxy group, as the electron-donating functional group, and
relationships n1≥1, n2≥1, n3≥1, (n1+n2−n3)≥2, and (n1+n2+n3)≥4 are satisfied, where n1, n2, and n3 represent the number of the first functional groups, the number of the second functional groups, and the number of the third functional groups in one molecule of the aromatic compound, respectively.

5. The solid electrolytic capacitor according to claim 4,
wherein the aromatic compound includes a benzene ring as the aromatic ring, and
the second functional group is located at a meta-position relative to the first functional group.

6. The solid electrolytic capacitor according to claim 4,
wherein at least one of the relationships n1≥2 and n2≥2 is satisfied.

7. The solid electrolytic capacitor according to claim 4,
wherein a relationship n3≥2 is satisfied.

8. The solid electrolytic capacitor according to claim 4,
wherein the number of carbon atoms in the alkoxy group is 1 to 4.

9. The solid electrolytic capacitor according to claim 4,
wherein the aromatic compound includes a benzene ring as the aromatic ring, and
the electron-donating functional group is located at an ortho-position or a para-position relative to the first functional group.

10. The solid electrolytic capacitor according to claim 4, wherein the aromatic compound has a naphthalene ring as the aromatic ring, and has at least the first functional group at a position of at least one selected from the group consisting of 2-position, 3-position, 6-position, and 7-position in the naphthalene ring.

11. The solid electrolytic capacitor according to claim 4, wherein the solid electrolyte included in the solid electrolyte layer has a weight reduction ratio of 3% or less when measured through thermogravimetric analysis in which the solid electrolyte is heated to 180° C., is kept at 180° C. for 20 minutes, is cooled from 180° C. to 30° C., and is then heated from 30° C. to 260° C. at a rate of 20° C./min.

12. The solid electrolytic capacitor element according to claim 1,
wherein the weight reduction ratio is 2.5% or less.

13. A solid electrolytic capacitor comprising
at least one solid electrolytic capacitor element according to claim 1.

14. The solid electrolytic capacitor element according to claim 3,
wherein the aromatic compound includes a benzene ring as the aromatic ring, and
the electron-donating functional group is located at an ortho-position or a para-position relative to the first functional group.

15. The solid electrolytic capacitor element according to claim 3,
wherein the aromatic compound has a naphthalene ring as the aromatic ring, and has at least the first functional group at a position of at least one selected from the group consisting of 2-position, 3-position, 6-position, and 7-position in the naphthalene ring.

16. The solid electrolytic capacitor according to claim 11,
wherein the weight reduction ratio is 2.5% or less.

* * * * *